US009403096B2

(12) United States Patent
Leyland et al.

(10) Patent No.: US 9,403,096 B2
(45) Date of Patent: *Aug. 2, 2016

(54) INTERACTIVE VIDEO GAME WITH VISUAL LIGHTING EFFECTS

(71) Applicant: Activision Publishing, Inc., Santa Monica, CA (US)

(72) Inventors: Robert Leyland, Novato, CA (US); I-Wei Huang, Novato, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,519

(22) Filed: Feb. 23, 2016

(65) Prior Publication Data
US 2016/0166933 A1 Jun. 16, 2016

Related U.S. Application Data

(63) Continuation of application No. 14/549,451, filed on Nov. 20, 2014, which is a continuation of application No. 13/335,737, filed on Dec. 22, 2011, now Pat. No. 8,894,462.

(51) Int. Cl.
*A63F 13/00* (2014.01)
*A63F 13/50* (2014.01)
*A63F 13/24* (2014.01)
*A63F 13/25* (2014.01)

(52) U.S. Cl.
CPC .............. *A63F 13/50* (2014.09); *A63F 13/24* (2014.09); *A63F 13/25* (2014.09)

(58) Field of Classification Search
USPC ............................................. 446/175; 463/42
See application file for complete search history.

(56) References Cited

U.S. PATENT DOCUMENTS

| 4,840,602 | A | 6/1989 | Rose |
| 5,413,355 | A | 5/1995 | Gonzalez |
| 5,533,920 | A | 7/1996 | Arad et al. |
| 5,661,470 | A | 8/1997 | Karr |
| 5,752,880 | A | 5/1998 | Gabai et al. |
| 5,766,077 | A | 6/1998 | Hongo |
| 5,853,327 | A | 12/1998 | Gilboa |

(Continued)

FOREIGN PATENT DOCUMENTS

| GB | 2365796 A | 2/2002 |
| WO | WO 2005-050948 A1 | 6/2005 |
| WO | WO 2007-101785 A1 | 9/2007 |

OTHER PUBLICATIONS

U.S. Appl. No. 13/335,737, filed Dec. 22, 2011, Robert Leyland I-Wei Huang, US 2013-0165223 A1, Office Action Jan. 9, 2013 Sep. 6, 2013 Mar. 27, 2014 Notice of Allowance Aug. 29, 2014.

(Continued)

*Primary Examiner* — Masud Ahmed
(74) *Attorney, Agent, or Firm* — Klein, O'Neill & Singh, LLP

(57) ABSTRACT

A video game includes a peripheral device that senses the presence and identity of toy objects near or on the peripheral. Each of the toy objects includes an identification device such as an RFID tag. Each of the toys is also associated with a corresponding game character or object. The peripheral device provides lighting effects based on characteristics of the game character or aspects of the game play sequence thereby enhancing the user's gameplay experience.

20 Claims, 16 Drawing Sheets

(56) References Cited

U.S. PATENT DOCUMENTS

| | | | |
|---|---|---|---|
| 5,873,765 A | 2/1999 | Rifkin et al. | |
| 6,056,618 A | 5/2000 | Larian | |
| 6,083,073 A | 7/2000 | McFarlane et al. | |
| 6,157,918 A * | 12/2000 | Shepherd | G06Q 30/08 705/35 |
| 6,167,353 A | 12/2000 | Piernot et al. | |
| 6,290,565 B1 | 9/2001 | Galyean, III et al. | |
| 6,354,947 B1 | 3/2002 | Dobrusskin et al. | |
| 6,388,665 B1 | 5/2002 | Linnett et al. | |
| 6,390,881 B1 | 5/2002 | Yu et al. | |
| 6,491,566 B2 | 12/2002 | Peters et al. | |
| 6,544,097 B1 | 4/2003 | Bain | |
| 6,554,679 B1 | 4/2003 | Shackelford et al. | |
| 6,560,511 B1 | 5/2003 | Yokoo et al. | |
| 6,572,431 B1 | 6/2003 | Maa | |
| 6,709,336 B2 | 3/2004 | Siegel et al. | |
| 6,737,957 B1 | 5/2004 | Petrovic et al. | |
| 6,773,325 B1 | 8/2004 | Mawle et al. | |
| 6,773,344 B1 | 8/2004 | Gabai et al. | |
| 6,905,391 B2 | 6/2005 | Soto et al. | |
| 6,965,298 B2 | 11/2005 | Feinberg | |
| 7,066,781 B2 | 6/2006 | Weston | |
| 7,081,033 B1 | 7/2006 | Mawle et al. | |
| 7,089,083 B2 | 8/2006 | Yokoo et al. | |
| 7,206,762 B2 * | 4/2007 | Sireau | G06Q 30/08 705/26.3 |
| 7,244,183 B1 | 7/2007 | England | |
| 7,387,559 B2 | 6/2008 | Sanchez-Castro et al. | |
| 7,500,917 B2 | 3/2009 | Barney et al. | |
| 7,524,246 B2 | 4/2009 | Briggs et al. | |
| 7,808,385 B2 | 10/2010 | Zheng | |
| 7,843,471 B2 | 11/2010 | Doan et al. | |
| 7,909,697 B2 | 3/2011 | Zheng | |
| 7,982,613 B2 | 7/2011 | Zheng | |
| 8,033,901 B2 | 10/2011 | Wood | |
| 8,128,500 B1 | 3/2012 | Borst et al. | |
| 8,157,611 B2 | 4/2012 | Zheng | |
| 8,292,688 B2 | 10/2012 | Ganz | |
| 8,864,589 B2 | 10/2014 | Reiche, III | |
| 2001/0031603 A1 | 10/2001 | Gabai et al. | |
| 2001/0032169 A1 * | 10/2001 | Sireau | G06Q 30/08 705/37 |
| 2002/0090985 A1 | 7/2002 | Tochner et al. | |
| 2003/0037075 A1 | 2/2003 | Hannigan et al. | |
| 2003/0076369 A1 | 4/2003 | Resner et al. | |
| 2004/0178886 A1 | 9/2004 | Watanabe et al. | |
| 2004/0210507 A1 * | 10/2004 | Asher | G06Q 40/00 705/37 |
| 2004/0214642 A1 | 10/2004 | Beck | |
| 2004/0229696 A1 | 11/2004 | Beck | |
| 2005/0027643 A1 * | 2/2005 | Amaitis | G06Q 40/02 705/37 |
| 2005/0197948 A1 * | 9/2005 | Davie | G06Q 40/00 705/37 |
| 2006/0030410 A1 | 2/2006 | Stenton et al. | |
| 2006/0105839 A1 * | 5/2006 | Graeve | A63F 3/00157 463/42 |
| 2006/0105840 A1 * | 5/2006 | Graeve | A63F 3/00157 463/42 |
| 2006/0273909 A1 | 12/2006 | Heiman et al. | |
| 2007/0015588 A1 | 1/2007 | Matsumoto et al. | |
| 2007/0143679 A1 | 6/2007 | Resner | |
| 2007/0250597 A1 | 10/2007 | Resner et al. | |
| 2007/0256716 A1 | 11/2007 | Resner et al. | |
| 2008/0085773 A1 | 4/2008 | Wood | |
| 2008/0163055 A1 | 7/2008 | Ganz et al. | |
| 2008/0305873 A1 | 12/2008 | Zheng | |
| 2009/0053970 A1 | 2/2009 | Borge | |
| 2009/0137323 A1 | 5/2009 | Fiegener et al. | |
| 2009/0158210 A1 | 6/2009 | Cheng et al. | |
| 2009/0163265 A1 * | 6/2009 | Amaitis | G07F 17/3227 463/20 |
| 2009/0163266 A1 * | 6/2009 | Amaitis | G07F 17/32 463/20 |
| 2009/0209312 A1 * | 8/2009 | Alderucci | G07F 17/3244 463/17 |
| 2009/0318234 A1 | 12/2009 | Christensen et al. | |
| 2010/0080015 A1 | 4/2010 | Yang | |
| 2010/0167623 A1 | 7/2010 | Eyzaguirre et al. | |
| 2010/0321638 A1 | 12/2010 | Schnuckle | |
| 2011/0088296 A1 | 4/2011 | Schnuckle | |
| 2011/0300941 A1 | 12/2011 | Weston et al. | |
| 2012/0295703 A1 | 11/2012 | Reiche et al. | |
| 2013/0065482 A1 | 3/2013 | Trickett | |
| 2013/0130587 A1 | 5/2013 | Cohen et al. | |

OTHER PUBLICATIONS

U.S. Appl. No. 14/549,451, filed Nov. 20, 2014, Robert Leyland I-Wei Huang, US 2015-0080129 A1.

U.S. Appl. No. 15/050,415, filed Feb. 22, 2016, Robert Leyland I-Wei Huang, Office Action May 4, 2016.

* cited by examiner

INTERACTIVE VIDEO GAME WITH VISUAL LIGHTING EFFECTS

CROSS-REFERENCE TO RELATED APPLICATIONS

The present application is a continuation of U.S. patent application Ser. No. 14/549,451, filed Nov. 20, 2014, which is a continuation of U.S. patent application Ser. No. 13/335,737, filed Dec. 22, 2011, now U.S. Pat. No. 8,894,462, the disclosures of which are incorporated by reference herein.

BACKGROUND OF THE INVENTION

The present invention relates generally to video games and, more particularly, to lighting effects in connection with a video game and a peripheral for a video game.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy.

Video games, being generally provided by way of an electronic device and associated display, often lack a physical component by which a player may touch and hold a representative object associated with video game play or otherwise have a physical object representative of video game play. Despite the sometimes intense graphics action of various video games, the game play experience remains two dimensional. Merely interacting with a displayed simulated environment may not allow game players to fully relate to game play, with a sharply distinct separation between a game play world and the world physically inhabited by the game players.

BRIEF SUMMARY OF THE INVENTION

One aspect of the invention provides a video game system, comprising a physical object configured with at least one fluorescing portion, a light source, and a console, in communication with the light source, the console including a processor for executing instructions to conduct a game play pattern and for controlling the light source to emit light to cause a visual effect when the at least one fluorescing portion of the physical object is exposed to the light.

Another aspect of the invention provides an interactive video game system comprising a peripheral device configured with a light source and at least one translucent surface, a processor for executing instructions relating to game play and for controlling the light source of the peripheral device to emit light to cause a visual effect when the at least one translucent surface of the peripheral is exposed to the light. In one aspect, the translucent surface may serve as a light diffuser to provide a diffuse appearance of light. Additionally, in at least one aspect of the invention, a toy object may be in contact with or proximate to the translucent surface. The toy object may include a portion formed of a fluorescing material. The fluorescing material may include a color tint. The fluorescing material may produce a further visual effect when exposed to light, as will be explained in greater detail later.

Another aspect of the invention provides a computer implemented method for use in providing a video game, comprising conducting a game play sequence, and controlling a light source to emit a light based on the game play sequence.

These and other aspects of the invention are more fully comprehended upon review of this disclosure.

DETAILED DESCRIPTION

Figure 1A:
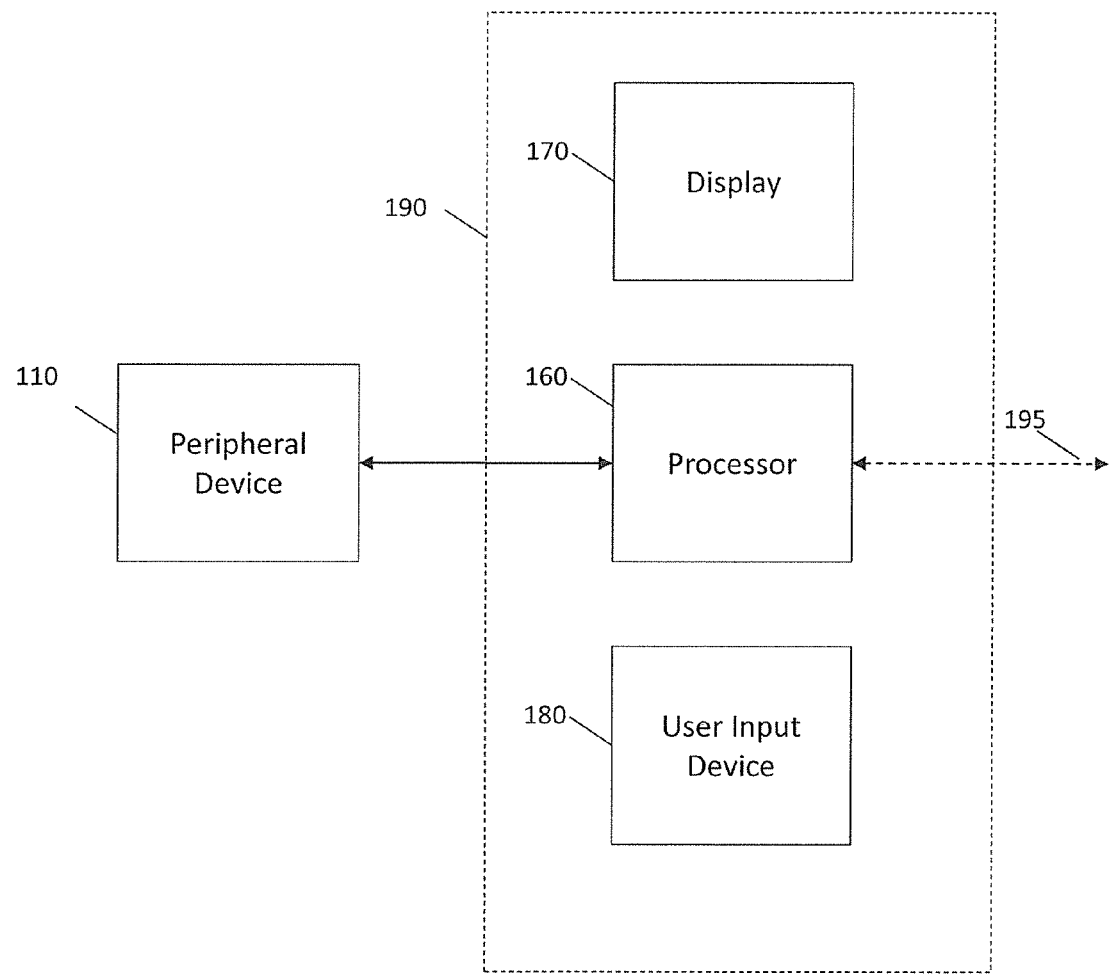
FIG. 1A is a block diagram illustrating an example of a video game system in accordance with aspects of the present invention.

FIG. 1A is a block diagram illustrating an example of a video game system in accordance with aspects of the present invention. Referring to FIG. 1A, the video game system includes a processor 160 for executing game related program instructions, a user input device to provide user inputs responsive to user actions 180, a display device 170 for displaying aspects of game play, and a device such as a peripheral device 110 in communication with the processor. The peripheral device includes a light source, red, green, and blue light emitting diodes (RGB LEDs) in some embodiments, which may be used to produce visual effects in connection with video game play. The peripheral device may be used to provide illumination of a physical object about the peripheral device, for example a toy object on or proximate to the peripheral device, and the toy object may include a translucent or fluorescing material, for example a fluorescing surface or portion, to allow for provision of lighting effects when provided with light from a light source such as the light source on the peripheral device. In this and other embodiments, a fluorescing material includes a material that may fluoresce or be configured to fluoresce when provided with light having an appropriate wavelength or range of wavelengths, for example. The fluorescing material may fluoresce at wavelengths providing particular colors, which may comprise bright colors, and may include colors such as green, blue, orange, yellow or red, or the fluorescing material may include a color tint, or be approximate a material with a color tint, such as a green, blue, orange, yellow or red tint, as just a few examples. The lighting effects may be produced at least in part by the fluorescing material being provided with light having a particular wavelength, and fluorescing light in response to receiving the light. In at least one embodiment the fluorescing light may be light of a different wavelength but the scope of the subject matter is not limited in this respect. If the fluorescing material is provided with a tint, the resulting light effect may include a color display of light in accordance with the color tint. The peripheral device may also include the capability to read information from and/or write information to the toy object.

In some embodiments, the processor is part of a video game console and the controller is an associated user input device, such as a video game controller, including one in the form of a sensor that senses user position or movements, and the display device may be a TV. Similarly, in some embodiments, the processor may be part of a personal computer or workstation, the controller may be a video game controller or a mouse and/or keyboard, and the display device may be a monitor. In some embodiments the processor, the display, and the user input device may be combined into one housing 190, for example in the form of a portable game device or other mobile device, such as a cell phone, which may be a smart phone or other device such as a tablet. In some embodiments, the processor may be located remotely from the display device, and may be, for example, a processor located on a remote server configured to execute instructions for a web- or cloud-based video game, and having networking capability wherein game play being displayed at a local user location while game play instructions are executed all or in part at a remote location.

The processor may execute program instructions related to game play as part of the video game system of FIG. 1A standing alone, or with the video game system of FIG. 1A being part of a networked system such as part of a web-based video game. When operating alone, the game related program instructions executed by the processor may include program instructions for determining game states based on user inputs, peripheral device inputs, and stored game related information, and for communicating with the peripheral device, and for commanding display of aspects of game play. When operating as part of a networked system, with for example the processor in communication with a network over communication line 195, some program instructions related to game play may be executed by the processor, while other network elements may execute other program instructions related to game play. In some networked embodiments the processor may execute game play program instructions relating to the peripheral device, the user input device, the display, and communication with other network elements, while other network elements, for example a server, execute program instruction determining game play states. In some networked embodiments the processor may execute instructions to determine some aspects of game status, for example position of a user-controlled character, while the other network elements determine other aspects of some states, for example position of a game controlled character.

Figure 1B:
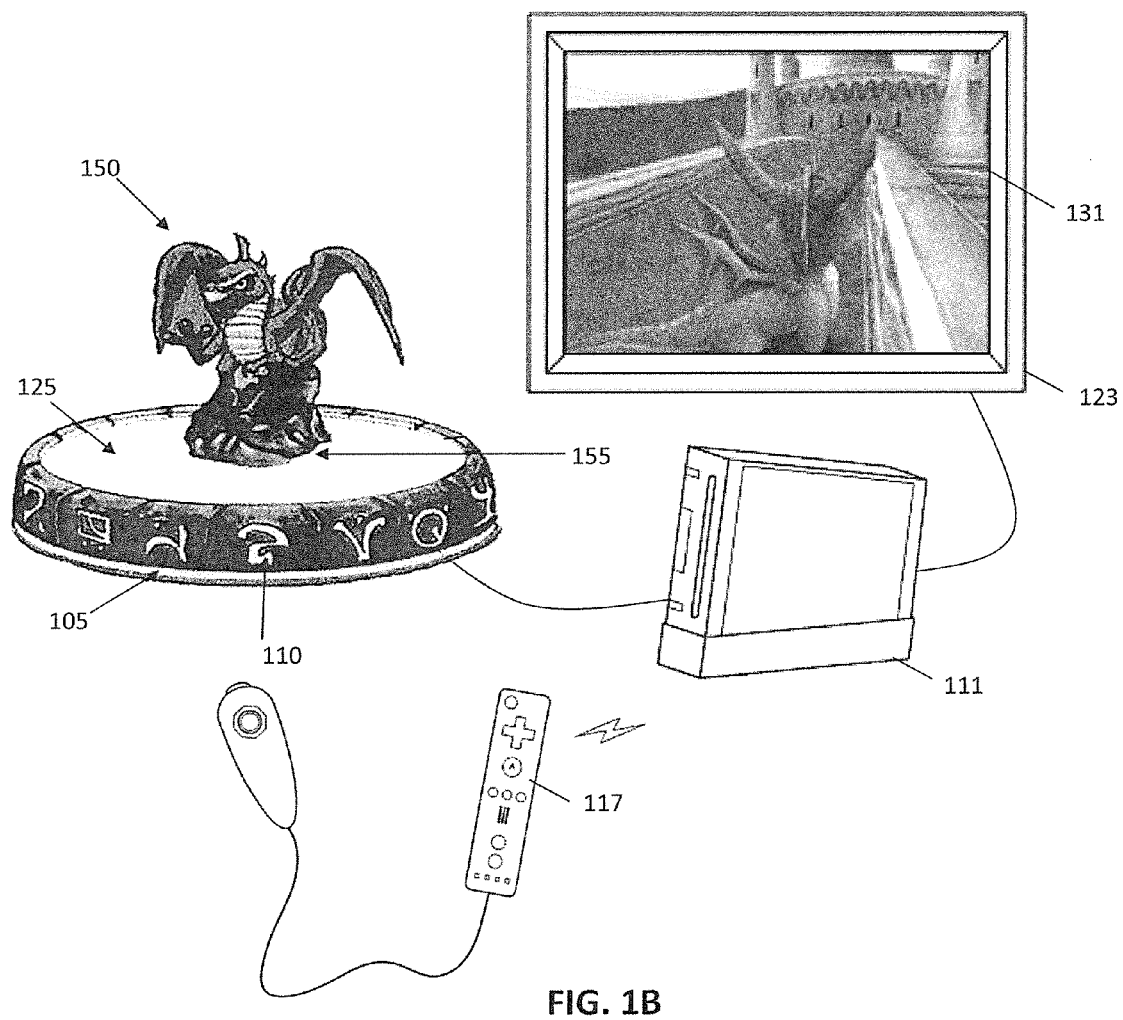
FIG. 1B illustrates an example of a video game system in accordance with aspects of the invention.

FIG. 1B illustrates an example of a video game system in accordance with aspects of the invention. The video game system includes a game console 111. As discussed with respect to FIG. 1A, a personal computer or mobile device may instead be used, in either a standalone fashion or in conjunction with components or devices in a network, and in one embodiment the video game may be embodied and/or executed all or in part on the Internet, by utilizing web- or cloud-based data or data stored all or in part on a remote server, for example. For convenience the discussion will generally refer to a game console, but it should be recognized that in various embodiments the game console is instead a personal computer, mobile device, a virtual device executing on a remote server, or may comprise a web- or cloud-based game that may be controlled all or in part by a computer, a mobile device such as a smart phone or a tablet, or a dedicated game console, for example, and may include a set of hardware not necessarily physically integrated but functionally integrated such that the functionality of the game console may be executed on one or more physical devices remote with respect to one another, although scope of the subject matter is non-limiting in this respect.

The game console may include a processor for executing program instructions providing for game play and associated circuitry, user input devices such as a game controller 117, a display device 123, and a peripheral device 105, which in various embodiments includes the capability to emit light. The peripheral device may also provide the capability to read from and write information to a toy object. The processor, responsive to inputs from the user input devices and the peripheral device, generally commands display on the display device of game characters in and interacting with a virtual world of game play and possibly each other. In addition, the processor, responsive to inputs from the peripheral device, may be used to add characters and objects to the virtual world, with the characters able to manipulate the added objects and move about the virtual world. For example, the processor may include characters in game play based on inputs from the peripheral device, and the processor may control actions and activities of game characters based on inputs from the user input devices.

Further, the processor may control a light source of the peripheral device to emit light in accordance with or responsive to the game play, characteristics of a video game character, video game achievements or the entry or exit of a character such as the toy object. In various embodiments the processor controls the light source of the peripheral device by commanding emission of light by the light source and ceasing of emission of light by the light source. In some embodiments the processor controls the light source of the peripheral device by asserting, or having asserted, one or more signals provided to the peripheral device commanding emission of light or no emission of light by the light source of the peripheral device. As shown in FIG. 1B the peripheral device is a housing which includes a top surface 125 which may be comprised of a translucent or diffusive material to allow light from at least one light source, and in various embodiments multiple light sources, within the peripheral device to pass through the surface. The light source may be a light emitting diode (LED), a light bulb with a light source therein, which may be an LED or some other light source for example, and in various embodiments the light source is within the peripheral device. In some embodiments, the light source includes red, green and blue (RGB) LEDs, and the particular color of light produced may be controlled all or in part by the processor, and may be controlled depending on factors including game play, toy objects proximate to or placed on the peripheral device.

Further, the peripheral device may also include translucent, fluorescing or diffusive material on the sides and/or the base 105 of the device and the translucent, fluorescing or diffusive material may be overlaid in part, in some embodiments, with a shaped non-translucent material, for example an opaque material, for example as shown in the peripheral device 110 of FIG. 1B, in order to produce lighted shapes, letters or other symbols visible from locations outside the peripheral device when exposed to the light from the light source. The translucent, fluorescing or diffusive material may also be provided with a color tint such as fluorescent green, orange, red, yellow, pink, for example, to thereby enable further visual effects when the translucent material is exposed to the light.

The instructions providing for game play are generally stored on removable media, for example, an optical disk. Accordingly, the game console may include an optical drive, for example, a DVD-ROM drive, for reading the instructions for game play. In various embodiments, however the instructions may be stored on some other memory device, may be stored on one or more external servers or may be at least partially web and or cloud-based instructions, or may be stored in internal memory of the game console, for example after being downloaded through a network connection. In some embodiments, the game console may be a personal computer, including similar internal circuitry as herein described, as well as, for example, a built-in display and built-in user input devices, such as a keyboard and a touch pad. Similarly, in some embodiments the game console may be a mobile device, such as a cell phone, personal digital assistant, a smart phone, a tablet, or portable game device including a processor.

The display device is generally coupled to the game console by a cable, although in some embodiments a wireless connection may be used. In many embodiments, the display device is a liquid crystal display. In some embodiments, the display device is a television, although in various embodiments the display device may be a display in a common housing with the processor, for example. A display screen 131 of the display device displays video images of game play, generally as commanded by the processor or other associated circuitry of the game console. In the embodiment of FIG. 1B, the display screen shows a screen shot of video game play. As illustrated, the screen shot shows a display of a character, generally controlled by and animated in accordance with user inputs, approaching an inanimate item in the form of what may be considered a castle.

The peripheral device, in some embodiments and as shown in FIG. 1B, has a substantially flat upper surface for placement of toy objects thereon. The flat upper surface and other surfaces of the peripheral device may be all or partially translucent or diffusive to enable the production of lighting effects using the light source of the peripheral device. Further, the translucent or diffusive materials may be comprised of a liquid, gas, or solid or any material which allows some light to pass through it. The translucent or diffusive material may be configured with a color tint to enable a variety of additional lighting effects.

The game player generally places game toy objects, for example, object 150 in the form and representative of a dragon as shown in FIG. 1B, on the flat surface of the peripheral device during game play. The toy object is generally in the form of and representative of a game item such as a game character or other game item. In some embodiments, the toy object is associated with a game character during game play. In some embodiments the toy object is associated with a moveable object, for example a sword or a box, or is associated with a location, such as a house, a castle, a ship or some other location corresponding with a particular location in a game world. The base of the toy object includes a bottom portion 155 at least partially comprised of a translucent or fluorescing material, such as, for example, plastic, glass, or any other material in any state of matter which allows light applied to or through the material and thereby results in a lighting effect in relation to the toy object.

Figure 1C:
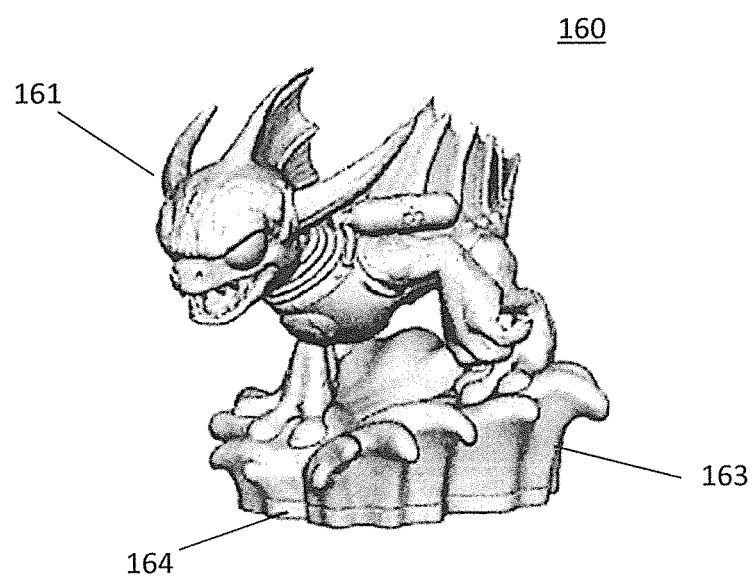
FIG. 1C is a model of a toy object in accordance with embodiments of the invention.

FIG. 1C is a model of a toy object in accordance with embodiments of the invention. As shown in FIG. 1C, toy object 160 includes a base 163 and a toy FIG. 161. Of course, the toy object could be configured without the base structure without departing from the spirit of the present invention. The base of the object includes a bottom portion 164 at least partially comprised of a translucent or fluorescing material, such as, for example, plastic, glass, or any other material in any state of matter which allows light applied to or through the material and thereby results in a lighting effect in relation to the toy object. In at least one aspect the material may be a fluorescing material that may fluoresce in response to light being applied to the material. The light may be applied by a peripheral device including lights, for example, or by lights external to game related items, for example lighting in a retail sales environment. While the translucent or fluorescing material surface is shown on the base of the toy object in FIG. 1C, the translucent or fluorescing material may be provided on any surface of the toy object to enable further visual lighting effects. For example, the eyes of the toy object may be made of a fluorescing material, to allow for the changing of the eye color for a particular character or based on game play using the toy object. Further, the translucent or fluorescing material may be located in the mid-region or top-region of the toy object, and a configuration of the toy object may allow generated light to pass at least partially through the translucent or fluorescing material to produce a lighting effect.

Each toy object may include machine-readable information, for example, memory, a radio frequency identification (RFID) tag or a barcode. In some embodiments the machine-readable information is in or on the base of the object. The machine-readable information may be sensed, read, and/or in some embodiments written, by the peripheral device, in some embodiments indirectly by way of sending data and commands to the toy object to write the data to memory of the toy object. The machine-readable information may include a numeric identifier. The machine-readable information allows the peripheral device, or the processor of the game console, to distinguish one toy object from other toy objects, and the machine-readable information may therefore be considered to include a toy identifier, and in some embodiments, each particular toy object has its own distinct identifier. In addition, in many embodiments the machine readable information includes additional information about a corresponding game character, including in some embodiments, status of the game character in a game.

When a toy object is read by the peripheral device, the peripheral device provides the game console an indication of the identifier and status information of the toy object, and generally the processor of the game console commands display of a corresponding game character or otherwise makes the corresponding game character available in game play. Likewise, when a toy object in the form of an article such as a hat or weapon is placed on the peripheral device, the processor may make a corresponding article appear in the game and the article may effect changes or the ability to make changes in the game. For example, when a hat toy object and a character toy object are concurrently on the peripheral device, the corresponding character in the game may possess the corresponding hat. In another example, when a ship toy object or castle toy object is on the peripheral device, the ship or castle may comprise an area of game play where game characters may engage in game play. Thus, video game play may be affected by use of real world objects, objects which may also be utilized for play and/or observation separate from video game play.

The processor of the game console may further command the peripheral device to produce lighting effects. For example when an object is placed in a detection area of the peripheral device, the processor may command the peripheral to produce light according to characteristics of the object. In one embodiment, when a toy object is placed in the detection area, the peripheral may produce sufficient light to cause a fluorescing effect in a toy object if the toy object includes a fluorescing material, for example. In one embodiment, the processor may command the peripheral to produce light according to game play. For example, when a game character is in a low health state, the processor may command the peripheral to produce a red light to alert the player of the health status. As a further example, when a character's health reaches a predetermined critically low state, the processor may command the peripheral to produce a flashing red light, by commanding the peripheral to toggle the light on and off. In various embodiments, however, the peripheral device may itself control lighting effects, for example based on information read from or written to the toy object by the peripheral device.

Figure 2:
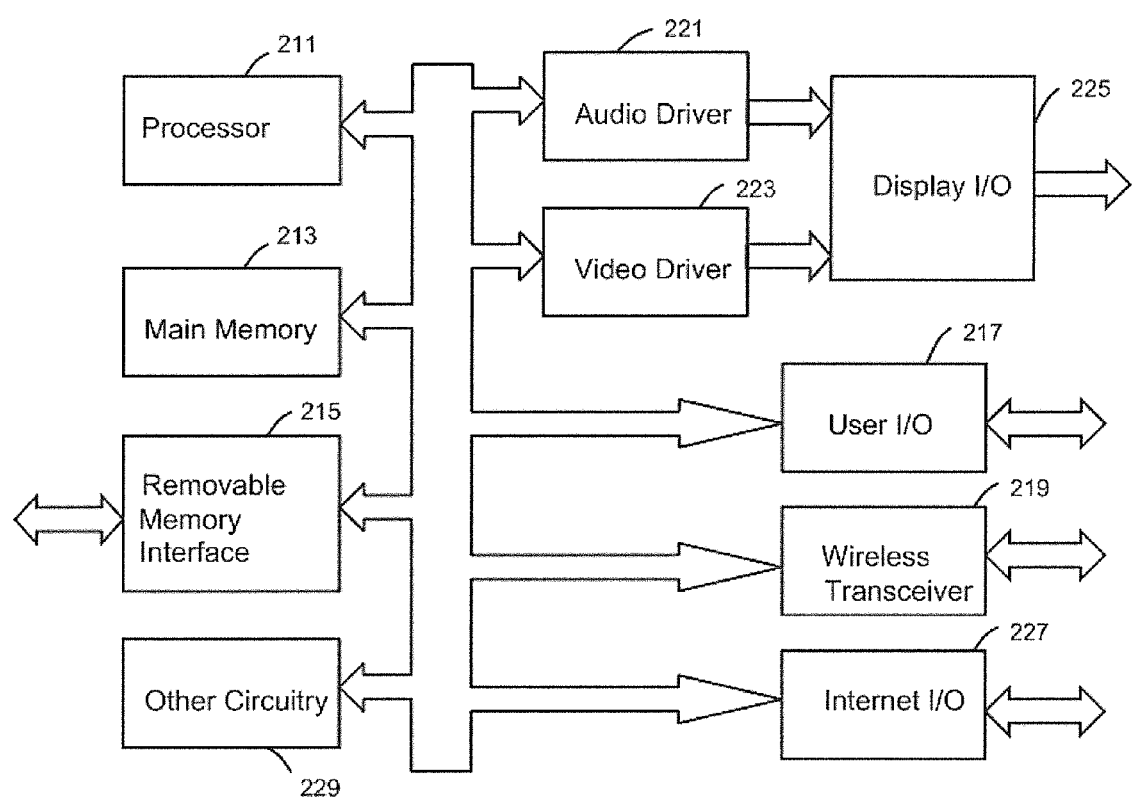
FIG. 2 is a block diagram of a video game console in accordance with aspects of the invention.

FIG. 2 is an example of a block diagram of a processor and associated circuitry, for example, for a game console, useful in accordance with aspects of the invention. As shown in FIG. 2 a processor 211 is connected to other components via a bus. The other components include a main memory 213 and a removable memory interface 215 generally coupled to a removable memory device, for example, a DVD-ROM drive. The processor may execute instructions retrieved from the removable memory device to control game play and store game state information in the main memory and for communicating information with a peripheral device used during game play. For example, the instructions may be for determining possible movements, positions, and locations of a game character. In some embodiments the instructions may be for display of game play status on a display and possibly for determining some game play states, and for communicating information from a peripheral device to a network element which determines some or all game play states.

The processor is coupled to an audio driver 221 and a video driver 223. The audio driver produces sound signals and the video driver produces image signals. The sound signals and image signals are transmitted from the game console via a display I/O device 225. The display I/O device generally supplies the sound and image signals to a display device. The device is external to the game console in some embodiments, or part of the game console in other embodiments. Sound signals may also be supplied to a peripheral device.

The processor may also be coupled to a user I/O device 217, a wireless transceiver 219, an user I/O device 227, and other circuitry 229. The user I/O device may receive signals from a peripheral device and/or signals from a keyboard, a mouse, and/or a game controller, with generally the keyboard, mouse, and/or controller being used by a user and providing user inputs, for example, during game play. Alternatively or additionally, the game console may receive user inputs via the wireless transceiver. The user I/O device provides a communication channel that may be used, for example, as an internet I/O device for multiple player games.

Figure 3:
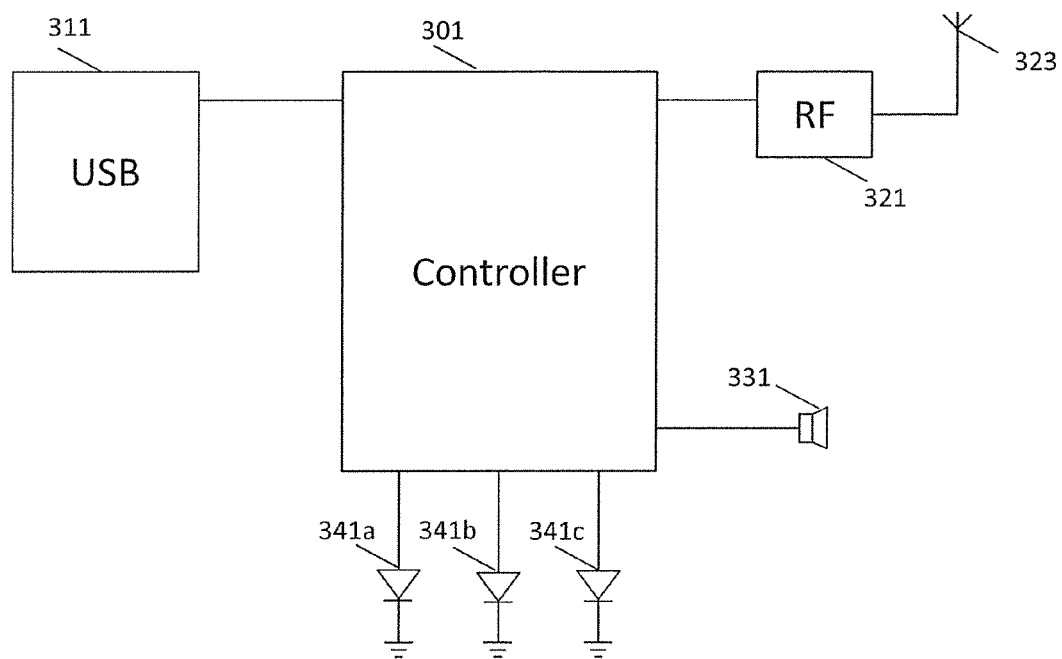
FIG. 3 is a block diagram of a video game peripheral in accordance with aspects of the invention.

FIG. 3 is a block diagram of a video game peripheral in accordance with aspects of the invention. The peripheral may be used in some embodiments as the peripheral device of FIG. 1. The peripheral may be used to provide information from the toy object to a game console and, in some embodiments, from the game console to the toy object. Accordingly, the peripheral includes a universal serial bus (USB) interface 311 to communicate with the game console. In some embodiments, the peripheral may use a different interface, for example, a wireless interface for communication with the game console. The information communicated between the peripheral and the game console may be encrypted, and the information read from or written to the toy object by the peripheral may also be encrypted.

The peripheral also includes a radio-frequency interface 321 and an I/O interface 323 to communicate with toy objects. In many embodiments, the radio-frequency interface is an RFID interface. In other embodiments, the peripheral may include a different interface for communicating with toy objects, such as an optical interface or a wired interface.

In one embodiment of an optical interface the toy object includes a light source, for example an LED, to provide information of the machine readable information and a photodiode to receive information of commands, with circuitry operable within the toy object to provide for associated operation of the LED and photodiode in performing communication functions. Power may be provided to the toy object by way of a battery, by way of RFID operations, or by other sources. In such an embodiment the peripheral device similarly includes a photodiode and LED for communication with the toy object.

In another embodiment the peripheral device includes an imaging device, for example a CCD and associated circuitry. In such embodiments the imaging device may generate an image, for analysis by the peripheral device or in most embodiments by the game console, with the image providing information related to the toy object. In some embodiments identity of the toy object may be determined by shape or other features, such as color or reflectivity, of the toy object or portions of the toy object. Similarly, identity and other information of the toy object may be provided by image information placed on the toy object, including, for example, information of stickers placed on the bottom of the toy, placed either prior to receipt of the toy object by a user or by the user, in which case the information may be changed by the user in accordance with game play results. The toy object may instead, or in addition may include bar code or bar code like information, with the peripheral device including bar code scanning components.

Further in some embodiments the toy object may include a wired connection to the peripheral device, or in some embodiments, a wired connection to the game console, possibly dispensing with the peripheral device. Similarly, in some embodiments the toy object may include wireless communication capabilities of the type commonly used with computers, for example Bluetooth or Wi-Fi capabilities.

The peripheral includes a controller 301 that is coupled to the USB interface and the radio-frequency interface. The controller adapts the signals between protocols used by the two interfaces. In some embodiments, the controller communicates with the radio-frequency interface based on commands received over the USB interface. For example, the controller may receive commands to determine what toy objects are present on the peripheral or to read from or write to a particular toy object. In other embodiments, the controller may independently communicate with the radio-frequency interface and supply resulting information to a game console over the USB interface. For example, the controller may, via the radio-frequency interface, regularly detect what toy objects are newly present on the peripheral and report the detected toy objects to the game console via the USB interface. The controller generally includes a programmable device such as a microprocessor performing program instructions. The program instructions may be stored in the peripheral as firmware or downloaded from the game console.

The peripheral also includes, in some embodiments, a loudspeaker 331. The loudspeaker provides audio signaling to game players and the signaling may relate to a particular toy object present on the peripheral. In some embodiments, the peripheral includes visual indicators such as light-emitting diodes 341a-c. The diodes may, for example, be illuminated with intensities or colors that signal performance in the video game of characters associated with toy objects on the peripheral, or as otherwise discussed herein. Both the loudspeaker and visual indicators are coupled to the controller. The controller signals the loudspeaker and visual indicators to operate, in some embodiments, according to commands received via the USB interface. In some embodiments the controller may signal the visual indicators to operate based on game state information or based on information read from or written to the toy object.

Figure 4:
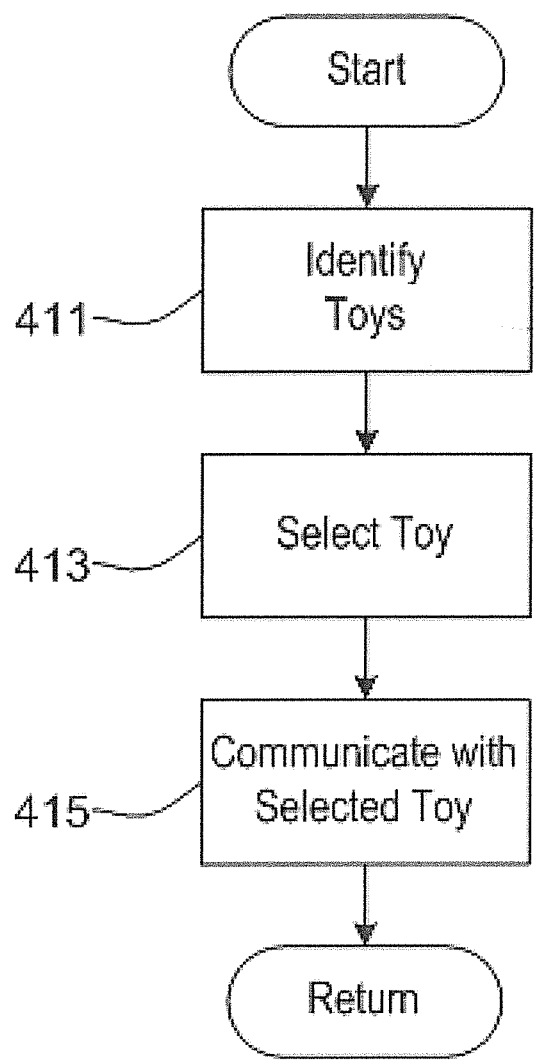
FIG. 4 is a flowchart of a process for communication with toy objects in accordance with aspects of the invention.

FIG. 4 is a flowchart of a process for communication with toy objects in accordance with aspects of the invention. The process may be implemented by a video game peripheral, a video game console, or a combination of devices. Additionally, the process may be implemented using a processor configured by program instructions. The process may be performed utilizing a standardized protocol, for example, the ISO/IEC 14443 standard for Identification Cards. Accordingly, the process may communicate with toy objects via radio-frequency communication.

In block 411, the process identifies toy objects in a defined region. For example, the process may determine what toy objects are on the surface of a video game peripheral as shown in FIG. 3. In various embodiments, the toy objects may be identified by RFID, barcodes, or optical recognition. In one embodiment, identification of toy objects includes a video game peripheral reading identifiers of the toy objects and supplying the identifiers to a video game console.

In block 413, the process selects a toy object for communication. The process may select the toy object by transmitting a selection command having an identifier matching the identifier of the toy object. In many embodiments, the process expects to receive an acknowledgment of the selection from the toy object. When an acknowledgment is not received, the process may retransmit the selection command or may provide a signal to a video game associated with the process that the selected toy object is not available.

In block 415, the process communicates with the selected toy object. For example, the process may read from a particular memory location of the toy object or may write to a particular memory location of the toy object. In many embodiments, the process expects to receive an acknowledgment or response from the toy object, and when not received, the process may retransmit the command or may signal the video game associated with the process that the selected toy is not available. The process thereafter returns.

Figure 5:
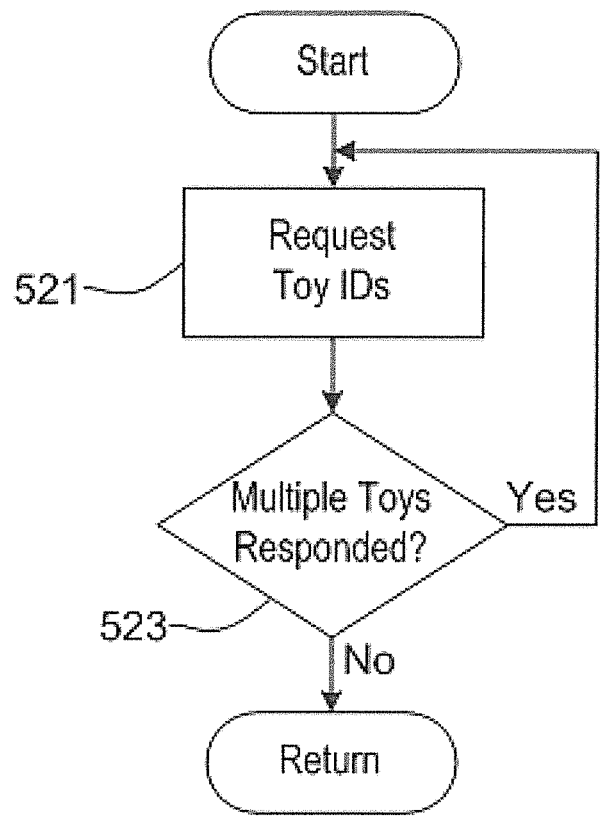
FIG. 5 is a flowchart of a process for identifying toy objects in accordance with aspects of the invention.

FIG. 5 is a flowchart of a process for identifying toy objects in accordance with aspects of the invention. The process may be performed as part of a process for communication with toy objects such as the process of FIG. 4. Accordingly, the process may be performed by a video game console, a video game peripheral, or a combination of devices, and the process may use a processor configured by program instructions.

In block 521, the process requests that toy objects send their identifiers. For example, in an embodiment of the process that uses the ISO/IEC 14443 protocol, the process may transmit a request command (REQA) or a wake-up command (WUP). The process listens for and receives any responses to the request that toys send their identifiers. Each identifier is generally unique to a particular toy.

In block 523, the process determines whether multiple toy objects responded to the request sent in block 521. For example, multiple toy objects may respond when there are multiple toy objects in a region that receives the request of block 521. The process may determine that multiple toy objects responded by detecting a collision between identifiers in the responses received in block 521. When the process determines that multiple toy objects responded, the process returns to block 521; otherwise, the process returns. The process may also determine that no toy objects responded. In various embodiments, the process may return when no toys responded or may return to block 521.

The process may, in block 521, include a range of identifiers in the request that toy objects send their identifiers. For example, the process may include a string of bits (for example, least-significant bits) in the request, with only toy objects having identifiers with starting bits having values that match the string being requested to send their identifiers. The process may iterate through block 521 and block 523 with an increasingly narrow range of identifiers in the request until an identifier is individually received from each toy object. The string of bits included in the request that toy objects send their identifiers may include the bits that were received by the process in block 521 prior to the collision detected in block 523 followed by a zero bit, and in a subsequent iteration followed by a one bit. For example, after sending a request for all toy objects to send their identifiers, the process may receive a one bit and a zero bit followed by a collision of bit values. The process accordingly requests toy objects whose identifiers start with one, zero, and zero to send their identifiers, and depending on the response or responses received may add additional bits to the string of bits in the request for identification. The process later requests toy objects whose identifiers start with one, zero, and one to send their identifiers, and depending on the response or responses received may add additional bits to the string of bits in the request for identification. The process may iterate through block 521 and block 523 performing a binary tree search for identifiers.

Figure 6:
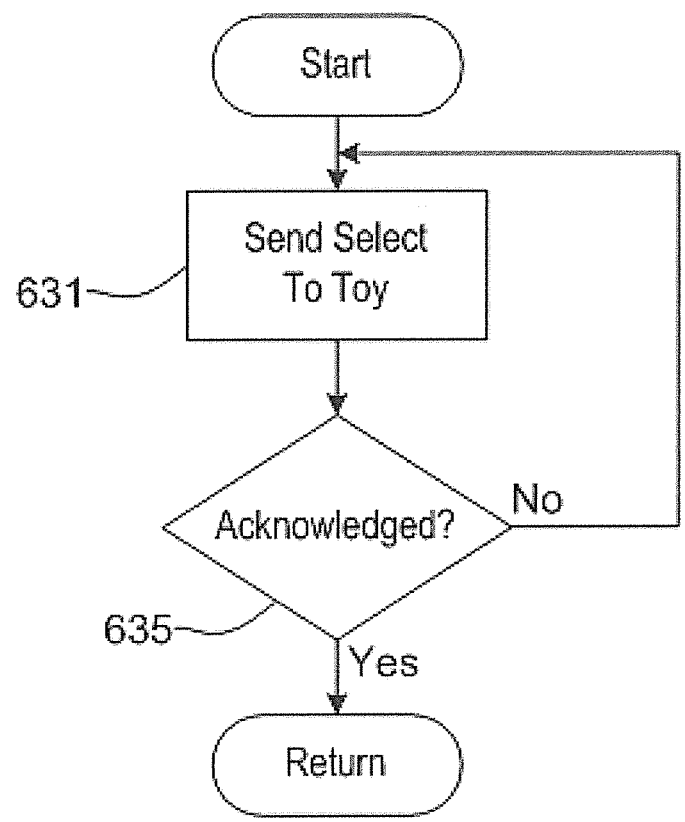
FIG. 6 is a flowchart of a process for selecting a toy object in accordance with aspects of the invention.

FIG. 6 is a flowchart of a process for selecting a toy object in accordance with aspects of the invention. The process may be part of a process for communication with toy objects such as the process of FIG. 4. Accordingly, the process may be performed by a video game console, a video game peripheral, or a combination of devices, and the process may use a processor configured by program instructions.

In block 631, the process selects a toy object for further communication. The process may, for example, select the toy object by sending a select command (SEL) that includes the identifier of the selected toy object.

In block 635, the process determines whether it received an acknowledgment from the toy object in response to the selection of block 631. The process may, for example, determine that it received an acknowledgment when it receives a selection acknowledge (SAK) message from the selected toy object. When the process determines that it has received an acknowledgment, the process returns; otherwise, the process returns to block 631 to retry selecting the toy object. In other embodiments, the process may return when an acknowledgment has not been received. When the process does not receive an acknowledgment, the process may additionally inform a video game associated with the process that the selected toy object is not present.

Figure 7:
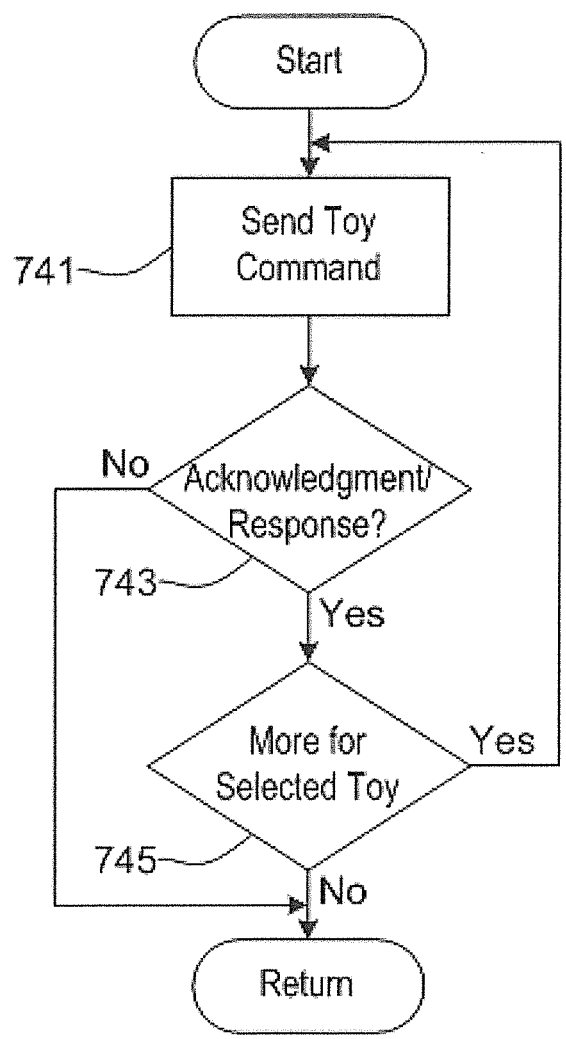
FIG. 7 is a flowchart of a process for communicating commands with a toy object in accordance with aspects of the invention.

FIG. 7 is a flowchart of a process for communicating commands with a toy object in accordance with aspects of the invention. The process may be as part of a process for communication with toy objects such as the process of FIG. 4. Accordingly, the process may be performed, for example, by a video game console, a video game peripheral, or a combination of devices, and the process may use a processor configured by program instructions.

In block 741, the process sends a command to the toy object. For example, the process may send a read command to acquire data from the toy object or a write command to supply data to the toy object. Accordingly, the command may include an address value indicating a memory location in the toy object to be accessed.

In block 743, the process determines whether it received an acknowledgment from the toy object in response to the command sent in block 741. The process may, for example, determine that it received an acknowledgment when it receives a message containing a positive acknowledgment (ACK) from the toy object. For a read command, the acknowledgment may include the data read. When the process determines that it has received an acknowledgment, the process continues to block 745; otherwise, the process returns. In other embodiments, the process may return to block 741 to retry sending the command when an acknowledgment has not been received. When the process does not receive an acknowledgment, the process may additionally inform a video game associated with the process that the toy object being commanded to communicate is not present.

In block 745, the process determines whether it has any more commands to send to the toy object. The process may determine that it has more commands for the toy object, for example, by checking a list of actions in the video game associated with the process. When the process determines that there are more commands for the toy object, the process returns to block 741; otherwise, the process returns.

Figure 8:
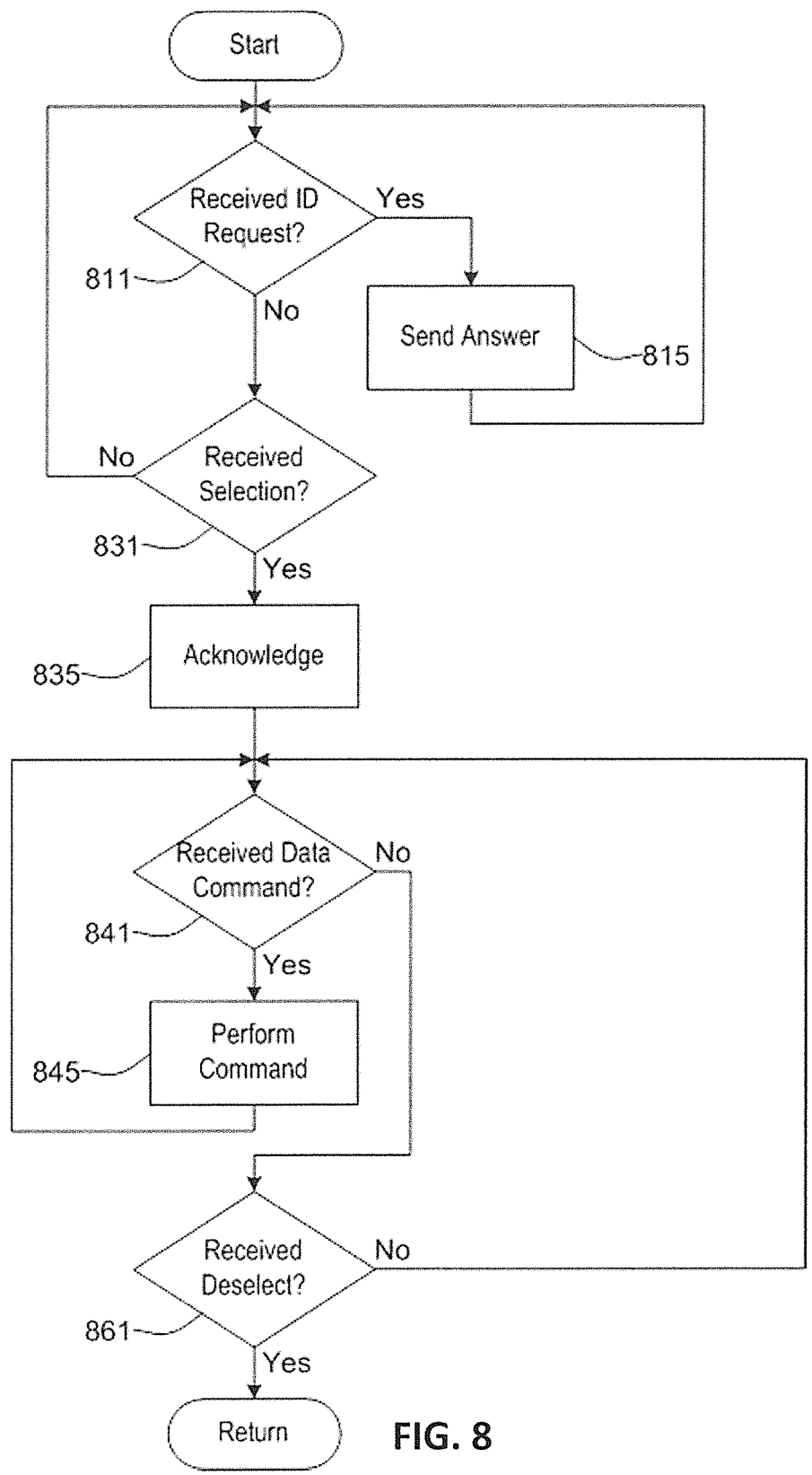
FIG. 8 is a flowchart of a process for communication with a video game peripheral in accordance with aspects of the invention.

FIG. 8 is a flowchart of a process for communication with a video game peripheral in accordance with aspects of the invention. The process may be implemented by a toy object used in a video game, for example, one of the toys of FIG. 1. The process may be performed utilizing a standardized protocol, for example, the ISO/IEC 14443 standard for Identification Cards. Accordingly, the process may communicate with a video game peripheral via radio-frequency communication. Furthermore, the process may communicate with a video game peripheral that performs any of the processes illustrated in FIGS. 4-7.

In block 811, the process determines whether it has received a request for an identifier associated with the toy object. For example, in an embodiment of the process that uses the ISO/IEC 14443 protocol, the process may determine whether it has received a request command (REQA) or a wake-up command (WUP). A request for an identifier may include a range of identifiers that are requested to respond, and the process determines that it has received a request for its identifier when its identifier is within the requested range of identifiers. When the process determines that it has received a request for its identifier, the process continues to block 815; otherwise, the process continues to block 831.

In block 815, the process sends an answer to the request for its identifier. The answer generally includes the identifier or a portion of the identifier. For example, the request for the identifier may have included a portion of the identifier with the process including the remaining portion of the identifier in the answer. Thereafter, the process returns to block 811.

In block 831, the process determines whether it has been selected for further data communication. The process may, for example, determine that it has been selected when a select command (SEL) is received that includes the identifier of the toy object. When the process determines that it has been selected, the process continues to block 835; otherwise, the process returns to block 811.

In block 835, the process acknowledges the selection determined in block 831. The process may, for example, transmit a selection acknowledge (SAK) message.

In block 841, the process determines whether it has received a data command. The process may, for example, determine that it has received a command instructing it to read data from or write data to a memory. When the process determines that it has received a data command, the process continues to block 845; otherwise, the process continues to block 861.

In block 845, the process performs the command of block 841. For example, the process may perform a read command by reading values from the memory and transmitting the values. In another example, the process may perform a write command by writing values supplied with command to the memory and transmitting an acknowledgment of the command. Thereafter, the process returns to block 841.

In block 861, the process determines whether it has been deselected from further data communication. The process may, for example, determine that it has been deselected when it receives a deselect command (DESEL) or a halt command (HLTA). When the process determines that it has been deselected, the process returns; otherwise, the process returns to block 841. In some embodiments, the process may wait in a halted state until it receives a wake-up command (WUP) before it returns. When the process is in the halted state, it does not respond to identification request commands, selection commands, or data commands.

Figure 9:
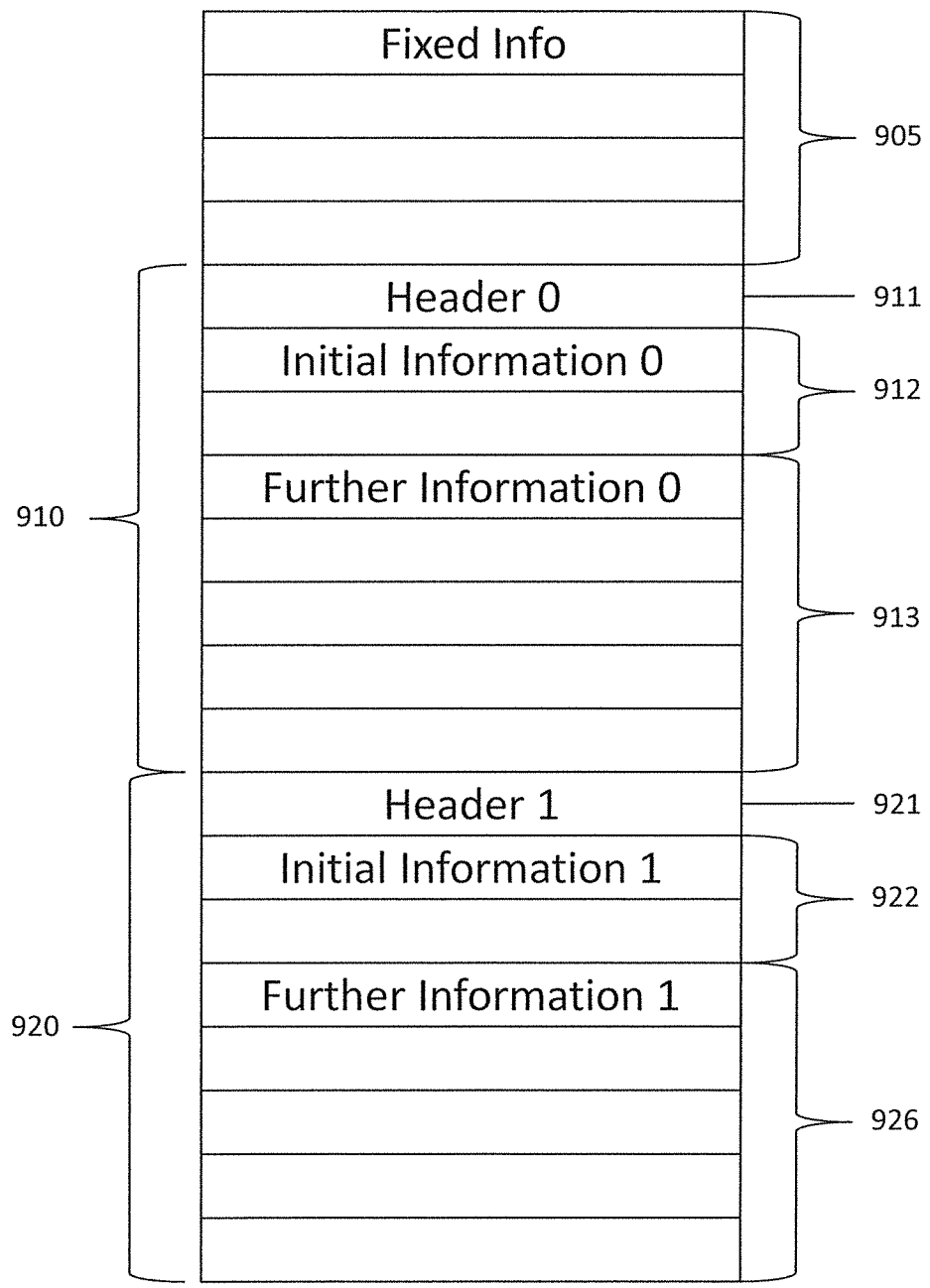
FIG. 9 is a diagram of data structure in accordance with aspects of the invention.

FIG. 9 is a diagram of data structure in accordance with aspects of the invention. The structure may be used to store data in a memory of a toy object. Information about the toy object, such as its characteristics and its status, are stored at various locations in the data structure. Although various fields of the data structure are shown in particular locations in FIG. 9, the data structure may use a different arrangement of the fields.

The data structure includes an area of fixed information 905. The fixed information includes information that identifies a type of toy and a particular instance of the toy object, for example, the fixed information may include a 32-bit serial number. The fixed information may also include an identification of objects related to the toy object, such as an identification of a separate code associated with the toy object. The fixed information generally includes a field for data verification, for example, a cyclic-redundancy check value or checksum. The fixed information is generally written when the toy object is created and not thereafter changed. In some embodiments, however, the fixed information may be thereafter changed.

The data structure also includes a first data area 910 and a second data area 920. Each of the data areas contains corresponding fields for certain values representing status information about a game play character associated with the toy object. However, the first data area and the second data area contain values that reflect the toy object's status at different times. For example, the first data area may contain current values and second data area may contain previous values.

The first data area 910 also includes a first header 911. The first header includes information about the toy object that may change frequently during game play, such as fields that store score values, experience levels, or money values. The first header may also include a field indicating how much cumulative time the toy object has been used for game play. The first header also contains a sequence field that may be used to determine whether the first data area contains current data.

The first data area 910 includes a first initial information area 912. The first initial information area includes information about the toy object which may be used in adding the character or other item associated with the toy object to game play, or in otherwise affecting the character or other item in game play. For example, the first initial information area may include a field that stores a name for the toy object. The first initial information area may include additional fields that store information useful for displaying a representation of the character associated with the toy object in the game. For example, there may be information indicating upgrades that have been acquired for the character associated with the toy or with objects the character associated with the toy object may be wearing, such as hats, or may be locations the character may interact within, such as a ship or castle. In some embodiments, however, the fixed information may contain sufficient information for adding the character associated with the toy object to game play, with the fixed information used instead of the initial information.

The first data area 910 includes a first further information area 913. The first further information area includes fields that indicate additional information about the character's status beyond the information contained in the first header and the first initial information area. The fields in the first further information area may include, for example, a value indicating when the character associated with the toy most recently joined the game, a value indicating when the toy object was first used in the game, an indication of a player to which the toy object belongs, and an indication of what challenges or skill tests the character associated with the toy object has completed in the game.

The first data area generally includes one or more fields for data verification, for example, checksums. In one embodiment, the first header includes three checksums: a checksum for the entire first data area, a checksum for the initial information area, and a checksum for the header itself. The inclusion of three checksums may allow the corresponding areas to be verified or updated without reading or writing other areas.

The second data area 920 includes a second header 921, a second initial information area 922, and a second further information area 926. Each of the areas in the second data area corresponds to a like named area in the first data area. In some embodiments, the data structure includes additional data areas, for example, a third data area and a fourth data area.

Figure 10:
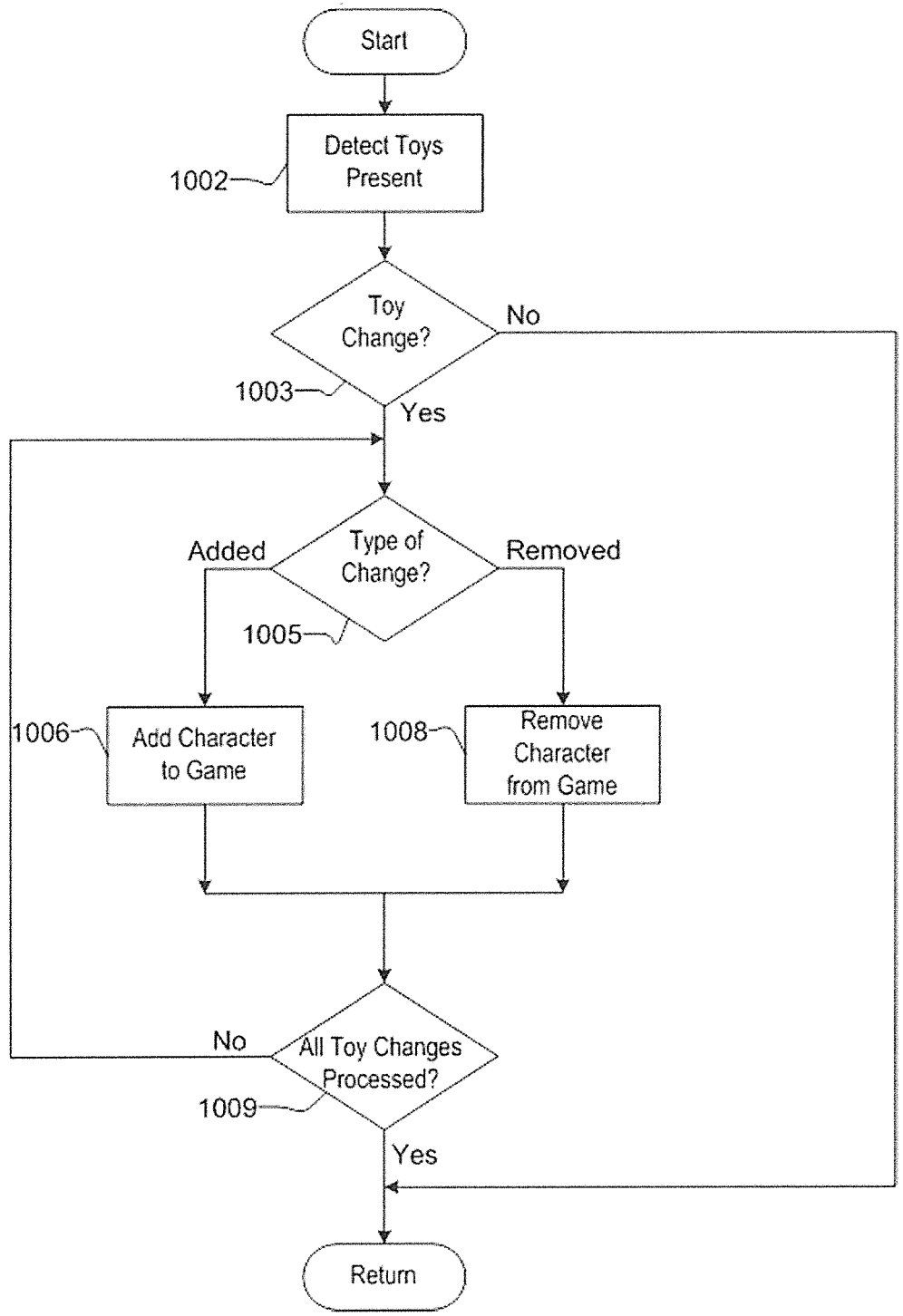
FIG. 10 is a flowchart of a process for changing characters present in a video game in accordance with aspects of the invention.

FIG. 10 is a flowchart of a process for changing characters present in a video game in accordance with aspects of the invention. The process may be performed by a video game console, a video game peripheral, or a combination of devices, and the process may use a processor configured by program instructions. Additionally, the process is generally performed repeatedly during play of the video game, for example, every second or every minute.

In block 1002, the process detects toy objects present on or near a peripheral device. In some embodiments, the process detects toy objects using a video game peripheral as described with reference to FIG. 3, and the process may detect which toy objects are present using a process as described with reference to FIG. 5.

In block 1003, the process determines whether there has been a change in the toy objects present. For example, the process may compare identifiers of the toy objects detected in block 1002 to a list of toy identifiers currently considered present in the video game or detected on a prior execution of the process. In some embodiments, the process may use a count of the toy objects present to determine a change in the toy objects present. When the process determines that there has been a change in the toy objects present, the process continues to block 1005; otherwise, the process returns.

In block 1005, the process determines a type of change in the toy objects present. When the process determines that the type of change in the toy objects present includes an addition of a toy object, the process continues to block 1006; when the process determines that the type of change in the toy objects present includes a removal of a toy object, the process continues to block 1008. When the type of change includes both addition and removal, the process, in various embodiments, may determine the type of change based on a fixed priority, a dynamic priority, or randomly depending, for example, on characteristics of the video game. In other embodiments, the process may continue to block 1006 and block 1008 concurrently.

In block 1006, the process adds a character, or in some embodiments an item, associated with an added toy object to the video game. For example, the process may display a representation of the character in the game and include the character in game play. When multiple toy objects have been added the process may select one of the toy objects to be added first. For example, the process may select a toy object based on a prioritization or randomly. In other embodiments, the process may add characters associated with multiple toy objects concurrently. Thereafter the process continues to block 1009.

In block 1008, the process removes the character associated with a removed toy object from the video game. For example, the process may remove display of a representation of the character from the game and exclude the character from subsequent game play. When multiple toy objects have been removed the process may select one of the toy objects to be removed first. In other embodiments, the process may remove multiple toys concurrently. Thereafter the process continues to block 1009.

In block 1009, the process determines whether all of the changes in toy objects present have been processed. The process may, for example, form a list of changes in block 1003 and remove toy objects from the list when the toy objects are added to the game in block 1006 or removed from the game in block 1008. When the process determines all of the changes have been processed, the process returns; otherwise, the process returns to block 1005.

Figure 11:
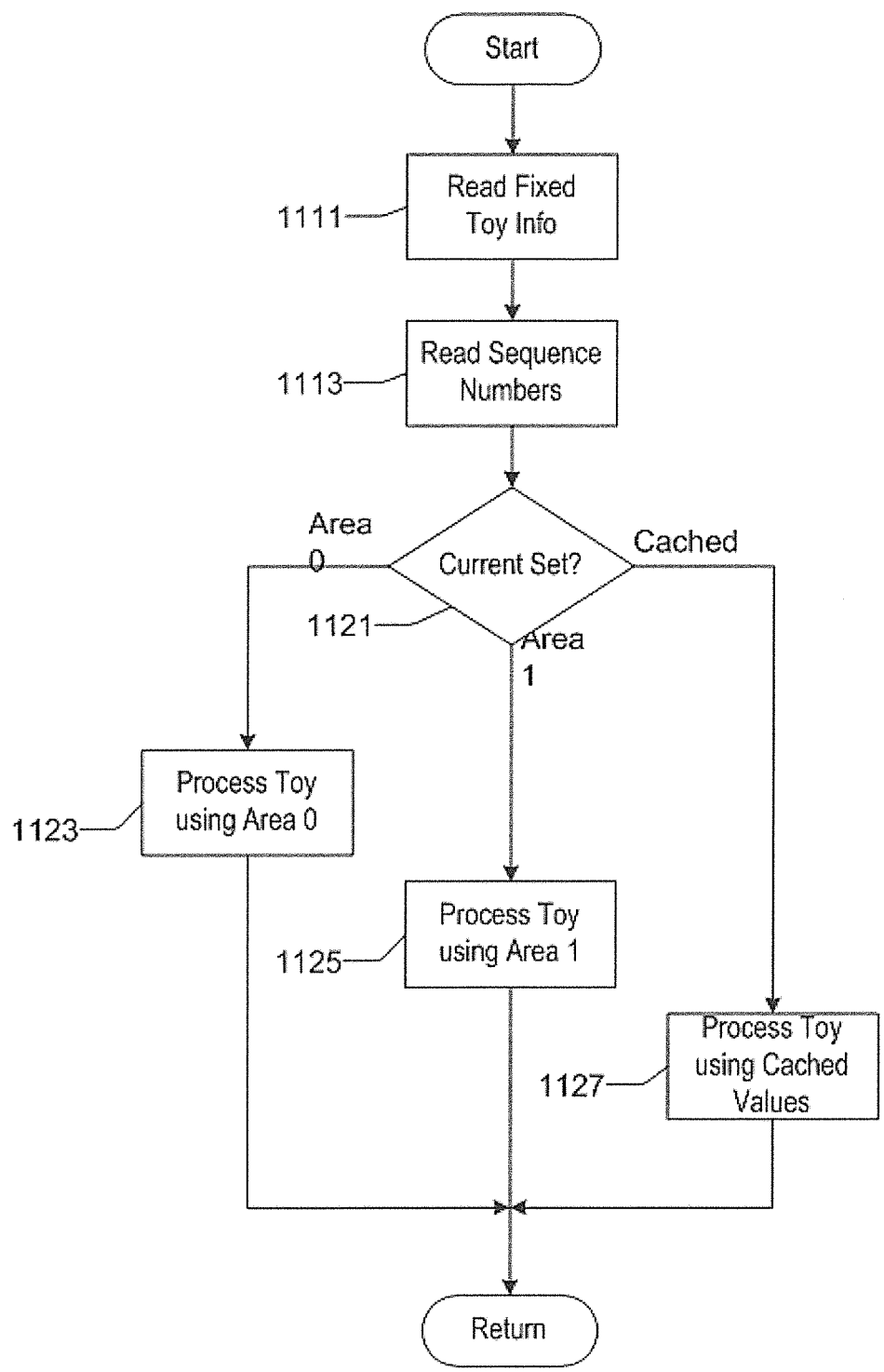
FIG. 11 is a flowchart of a process for adding characters in a video game in accordance with aspects of the invention.

FIG. 11 is a flowchart of a process for adding characters in a video game in accordance with aspects of the invention. The process may be performed by a video game console, a video game peripheral, or a combination of devices, and the process may use a processor configured by program instructions. The process of FIG. 11 may be performed in association with the process for changing characters present in a video game of FIG. 10. Additionally, the process may be used with toy objects that store information in a data structure as illustrated by FIG. 9. Multiple instances of the process may be run concurrently, for example, an instance of the process for each of multiple toy objects.

In block 1111, the process reads fixed information from a toy object. The information may be read using a process as shown in FIG. 4. The fixed information includes values that uniquely identify the toy object and type of toy object.

In block 1113, the process reads sequence values for each of multiple data areas of toy information. The flowchart of FIG. 11 illustrates a process for toy objects with two data areas, data area 0 and data area 1, but other numbers of data areas may be used. The sequence numbers may be stored in headers of the data areas. Each sequence value indicates when, in comparison to other headers, the header was written.

For example, the sequence value may be incremented modulo a maximum value each time a header is written. The process may, in some embodiments, also determine a sequence number for cached data values associated with the toy object. The video game may save data values for the toy object in a cache from when the toy object was previously played in the game. The cached data values may be useful, for example, in updating character information on the toy object in the event the toy object does not contain, for whatever reason, the most recent character data. Such a circumstance may occur, for example, if a toy object is suddenly removed from the peripheral device during game play, and at a time before the most recent character data was written to the toy object. When the toy object is later again placed on the peripheral, the cached data values may be used to update the character data on the toy object.

In block 1121, the process determines which sequence value is most recent. The process may order the sequence values according to the order in which they would be generated and select the last in sequence as the most recent. When the process determines that the sequence value from data area 0 is most recent, the process continues to block 1123; when the process determines that the sequence value from data area 1 is most recent, the process continues to block 1125; when the process determines that the cached sequence value is most recent, the process continues to block 1127.

In block 1123, the toy object is processed using data area 0. For example, the process may read toy object information from data area 0 and use the information to add a character associated with the toy object to the video game. Thereafter the process returns.

In block 1125, the toy object is processed using data area 1. Processing the toy object using data area 1 is generally the same as for block 1123, except information from data area 1 is used. Thereafter the process returns.

In block 1127, the toy object is processed using cached values. Processing the toy object is generally the same as for block 1123 except cached information about the toy object is used. Thereafter the process returns.

The process of FIG. 11 may include error checking of information read from the toy object. When the process determines that data read from the toy object contains an error or is unreliable, it may alter the processing. For example, if one of the sequence numbers read in block 1113 is unreliable, the associated data area may be excluded from further processing.

Figure 12:
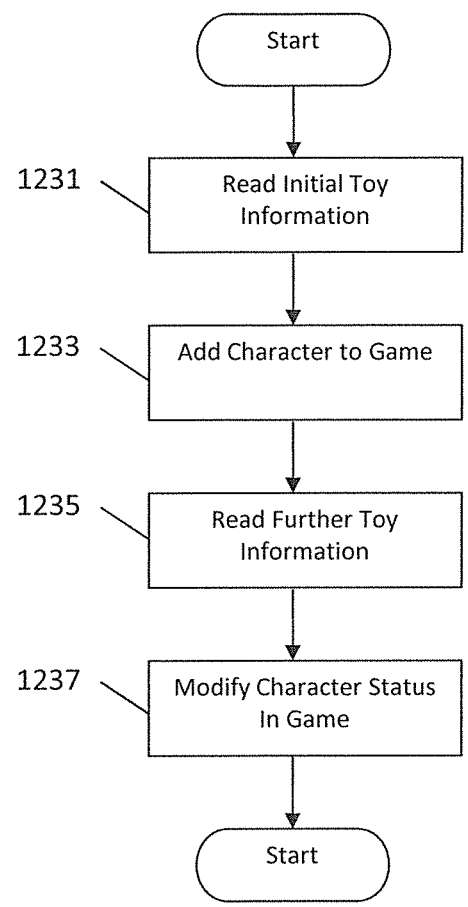
FIG. 12 is a flowchart of a further process for adding characters in a video game in accordance with aspects of the invention.

FIG. 12 is a flowchart of a further process for adding characters in a video game in accordance with aspects of the invention. The process may be performed by a video game console, a video game peripheral, or a combination of devices, and the process may use a processor configured by program instructions, and the processor may be part of a game console and/or a processor of a network element in various embodiments. The process of FIG. 12 may be performed as part of block 1006 of the process of FIG. 10 and also in association with the process of FIG. 11. The process may be used with toy objects that store information in a data structure as illustrated by FIG. 9.

In block 1231, the process reads initial information from the toy object. The initial information includes information about the toy object that is used to add the toy object to game play. In some embodiments, the initial information is read using a process illustrated by FIG. 4. In some embodiments, the initial information includes a name of the toy object and objects the toy object is wearing. In one embodiment, the process commands a video game peripheral to read the initial information from the toy object. In another embodiment, the process may receive initial information that had previously been read by a video game peripheral.

In block 1233, the process adds a character associated with the toy object to the video game. For example, the process may display a representation of a character associated with the toy object or an animated sequence for the character on the display screen of the video game system illustrated by FIG. 1. Displaying the character utilizes the initial information read in block 1231. The process also makes the character available for subsequent game play.

In block 1235, the process reads further information from the toy object. The further information is generally read in the same manner the initial information was read in block 1231. The further information may include, for example, a value indicating when the toy object most recently joined the game, a value indicating when the toy object was first used in the game, an indication of which player the toy object belongs to, and an indication of what challenges or skill tests the character associated with the toy object has completed in the game, and various information related to the status, for example the capabilities, of the character associated with the toy object, for example as may have been modified or changed as a result of prior game play. The further information combined with the fixed and/or initial information generally includes complete information available from the toy object.

In block 1237, the process modifies status of the character associated with the toy object in the video game. For example, the process may add details read in block 1235 to the character representing the toy object and to the status of the character in the video game. Thereafter the process returns.

Figure 13:
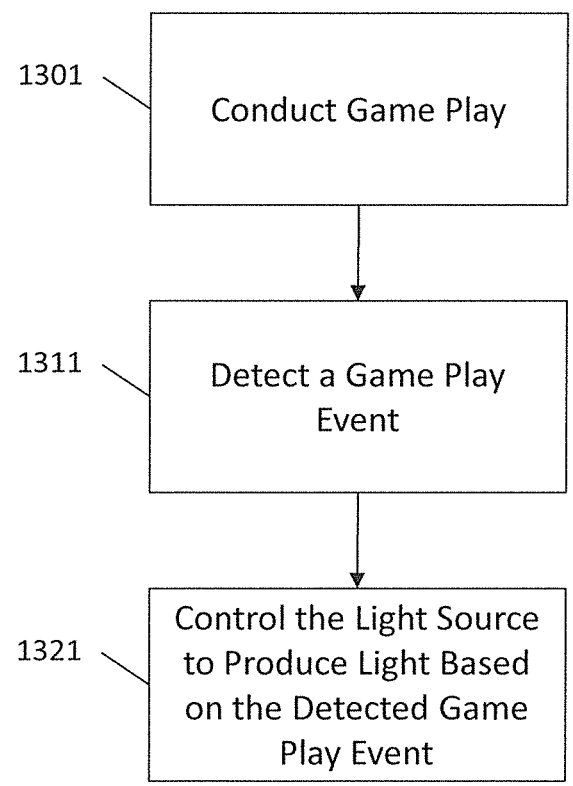
FIG. 13 is a flowchart of a process for providing visual lighting effects in connection with a video game in accordance with aspects of the invention.

FIG. 13 is a flowchart of a process for providing visual lighting effects in connection with a video game in accordance with aspects of the invention. In block 1301, the processor of the video game console executes instructions to conduct a game play sequence based in part on inputs by a player. In block 1311, the process detects a game play event. The video game system may include a data structure including a plurality of predetermined events and a lighting effect that is to be produced in response to the occurrence of said game play event. Game play events may include, for example, initiating a new game, placing and/or removing an object on the peripheral device, level advancement of a character, high score achievements by a character or a game player, defeating of an enemy character, entry of a character or object to game play or to a new location or location type within the virtual world. In one example, a white light is to be produced if a character advances in level, but a red light is to be produced if the character is defeated by another game play entity, for example an enemy. In another example, a blue light is to be produced if the character enters a body of water.

In block 1321, the process controls a light source of the peripheral device to produce a light based on the detected event. The peripheral device may be used to control RGB LEDs to produce any one of a plurality of colors by activating or deactivating a combination of the LEDs of the peripheral device. As noted previously, the peripheral device or a toy object may include a translucent or fluorescing portion which may produce additional lighting effects such as by fluorescing in response to the produced light.

Figure 14:
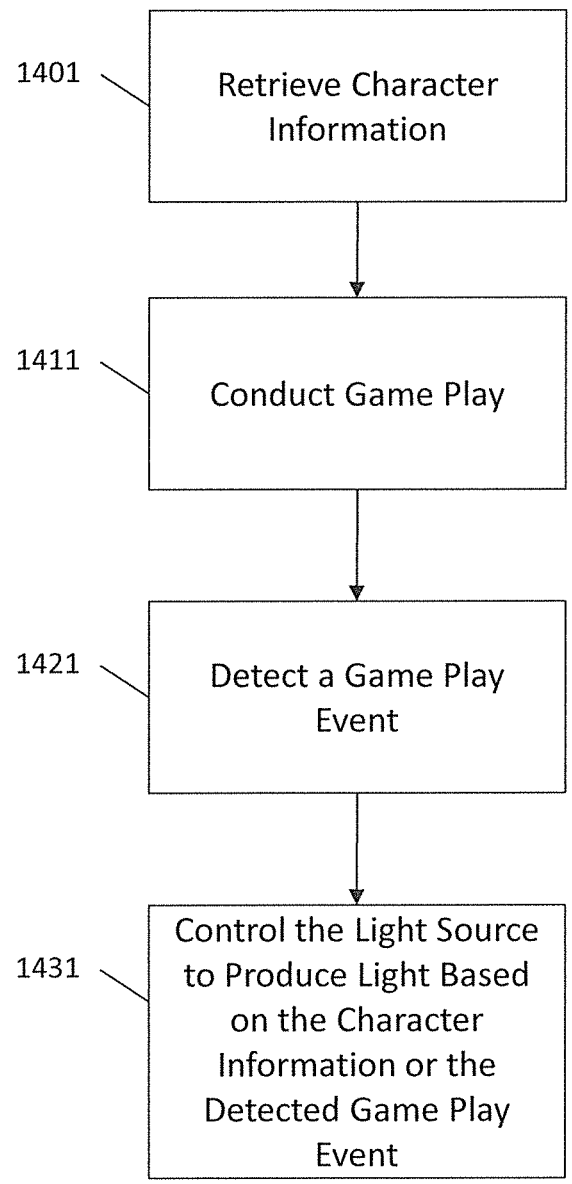
FIG. 14 is a flowchart of a process for providing visual lighting effects in connection with a video game in accordance with aspects of the invention.

FIG. 14 is a flowchart of a process for providing visual lighting effects in connection with a video game in accordance with aspects of the invention. In block 1401, the video game console retrieves information related to the character. The character information may be retrieved from the video game disc, or from information stored in a memory of the physical toy object as described above. Alternatively, character information may be obtained from a remote location such as from the internet, remote server, web- or cloud-based storage or the like, and may include updated character info based on historical game play, for example. The character information may include, for example, an elemental association, character level, number of victories, powers possessed by the character and other character attributes.

In block 1411, the processor of the video game console executes instructions to conduct a game play sequence based at least on the character information retrieved. In block 1421, the process detects a game play event. In block 1431, the process controls a light source of the peripheral device to produce a light based on the character information and/or the detected event. In various embodiments the character information is for a character represented by a toy object present on the peripheral device, and the toy object may include a fluorescing surface or portion from which a lighting effect results due to application of light from the light source. In some embodiments different characters may have fluorescing surfaces or portions with different color tints, allowing for different effects, particularly when the light source includes for example separately controllable RGB LEDs.

Although the invention has been discussed with respect to various embodiments, it should be recognized that the invention comprises the novel and non-obvious claims supported by this disclosure.

What is claimed is:

1. A non-transitory computer-readable medium having computer program instructions stored thereon for providing video game play, the computer program instructions, when executed by one or more physical processors of a gaming console, causing the gaming console to:
   determine that machine-readable information, received from a toy object through a peripheral device coupled to the game console, comprises an identifier associated with a virtual game character, the virtual game character representative of the toy object, and the toy object including a base comprising a translucent or diffusive material;
   command display of the virtual game character in a video game; and
   command at least one of a plurality of light sources of the peripheral device to emit light, the peripheral device configured such that at least some of the emitted light will pass through a translucent surface of the peripheral device, in response to game play of the video game;
   wherein the base of the toy object is configured to provide a visual effect when exposed to the emitted light passed through the translucent surface of the peripheral device.

2. The computer-readable medium of claim 1, wherein the light sources of the peripheral device include a red, green, or blue light emitting diode.

3. The computer-readable medium of claim 1, wherein the translucent or diffusive material of the base of the toy object comprises plastic.

4. The computer-readable medium of claim 1, wherein the translucent or diffusive material of the base of the toy object has a color tint.

5. The computer-readable medium of claim 4, wherein the color tint is blue.

6. The computer-readable medium of claim 1, wherein at least one of the light sources is configured to produce a blue light.

7. The computer-readable medium of claim 1, wherein the computer program instructions further cause the gaming console to command at least one of the light sources to emit light at a timing in response to a game play event.

8. The computer-readable medium of claim 1, wherein the computer program instructions further cause the gaming console to command at least one of the light sources to emit light in a color at a timing based on a game play event.

9. The computer-readable medium of claim 1, wherein the computer program instructions further cause the gaming console to command at least one of the light sources to flash.

10. The computer-readable medium of claim 1, wherein the machine-readable information is stored in a memory component in the base of the toy object.

11. A video game system, comprising:
    a toy object representative of a game character in a video game, the toy object including machine readable information and a base comprised of a translucent or diffusive material;
    a peripheral device, separate from the toy object, having a plurality of light sources, an interface for reading the machine readable information of the toy object, and a translucent surface for placement of the toy object; and
    a non-transitory computer-readable medium having computer program instructions stored thereon for providing video game play, the computer program instructions, when executed by one or more physical processors of a gaming console, causing the gaming console to: (i) conduct game play of the video game, and (ii) control the light sources of the peripheral device to emit light through the translucent surface of the peripheral device in response to game play events of the video game;
    wherein the base of the toy object provides a visual effect when exposed to the light emitted by the peripheral device.

12. The computer-readable medium of claim 11, wherein the light sources of the peripheral device include a red, green, or blue light emitting diode.

13. The computer-readable medium of claim 11, wherein the translucent or diffusive material of the base of the toy object comprises plastic.

14. The computer-readable medium of claim 11, wherein the translucent or diffusive material of the base of the toy object has a color tint.

15. The computer-readable medium of claim 14, wherein the color tint is blue.

16. The computer-readable medium of claim 11, wherein at least one of the light sources is configured to produce a blue light.

17. The computer-readable medium of claim 11, wherein the computer program instructions further cause the game console to control at least one of the light sources to emit light at a timing in response to a game play event.

18. The computer-readable medium of claim 11, wherein the computer program instructions further cause the game console to control at least one of the light sources to emit light in a color at a timing based on a game play event.

19. The computer-readable medium of claim 11, wherein the computer program instructions further cause the game console to control at least one of the light sources to flash.

20. The computer-readable medium of claim 11, wherein the machine-readable information is stored in a memory component in the base of the toy object.

* * * * *